United States Patent [19]

Sommers

[11] Patent Number: 4,910,009

[45] Date of Patent: Mar. 20, 1990

[54] ULTRA HIGH PURITY HALIDES AND THEIR PREPARATION

[75] Inventor: James A. Sommers, Albany, Oreg.

[73] Assignee: Teledyne Industries, Inc., Albany, Oreg.

[21] Appl. No.: 190,992

[22] Filed: May 6, 1988

[51] Int. Cl.[4] .................... C01F 3/00; C01F 7/48; C01B 9/00

[52] U.S. Cl. .................... 423/492; 423/72; 423/76; 423/135; 423/495

[58] Field of Search .............. 423/72, 76, 135, 492, 423/495

[56] References Cited

U.S. PATENT DOCUMENTS

| | | | |
|---|---|---|---|
| 2,993,000 | 7/1961 | Kingsbury | 423/492 |
| 3,052,518 | 9/1962 | Frey | 423/135 |
| 3,294,482 | 12/1966 | Lerner | 423/492 |
| 3,671,186 | 6/1972 | Ishizuka | 423/492 |
| 3,966,458 | 6/1976 | Spink | 423/492 |
| 4,514,373 | 4/1985 | Wyndham | 423/135 |
| 4,563,338 | 1/1986 | Seon et al. | 423/492 |
| 4,578,252 | 3/1986 | Pastor et al. | 423/72 |
| 4,652,438 | 3/1987 | Folweiler | 423/489 |
| 4,666,486 | 5/1987 | Hutta | 423/72 |
| 4,680,044 | 7/1987 | Pastor | 423/72 |
| 4,737,244 | 4/1988 | McLaughlin et al. | 423/76 |
| 4,749,448 | 6/1988 | Stoltz et al. | 423/76 |

Primary Examiner—Gregory A. Heller
Attorney, Agent, or Firm—Shoemaker and Mattare, Ltd.

[57] ABSTRACT

The process for purifying a contaminated chloro, bromo or iodo precursor salt of zirconium, hafnium or aluminum by means of providing a molten thermal body of one or more alkali or alkaline earth metal halides and the precursor salt containing impurities, maintaining the body at a temperature sufficient to volatilize the precursor salt away from its impurities while effecting a reducing condition in the body by means of a fluid, mobile reducing agent which is non-reducing of said precursor salt, and isolating the purified volatilized precursor salt from the body. The ultra purified isolated volatilized precursor salt can then be reacted with a fluorinating agent to produce the highly purified fluoride for use in optical fiber grade glass or the like.

20 Claims, 1 Drawing Sheet

ULTRA HIGH PURITY HALIDES AND THEIR PREPARATION

BACKGROUND OF THE INVENTION

This invention concerns the synthesis of extremely pure salt materials for use in glass products such as optical fibers, solid state lasers, and dielectric materials, wherein contaminants measured in just a few parts or less, per billion of the desired salt are often intolerable. In particular the invention concerns the purification of the chloro, bromo and iodo salts of zirconium, hafnium and aluminum, hereinafter termed "precursor salts", which can be reacted with fluorinating agents to give the ultra pure fluorides, hereinafter termed "product salts", in commercially desired quantities necessary for the preparation of high quality fluoride glasses, such as "ZBLAN", having extremely low levels of cationic and oxide impurities, and useful for example, in low-loss IR transmission applications.

The metal fluorides for IR glass preparation must have very low levels of impurity, with respect, for example, to transition elements, rare earths, and hydroxide ion in order to minimize absorption in the 2 to 4 micron range of the IR region of the spectrum. Furthermore, particulate materials such as metal oxides, carbides, carbon, coke, phosphides, and the like, must be essentially absent since they serve as scattering centers for the electromagnetic radiation and thus produce undesirable attenuation. Such impurities might seem to be out of place in purified fluoride compounds which typically are used in glass manufacture, however, in the minute quantities with which the present invention is concerned, these impurities can easily be introduced by the use of particular materials present in chemical process equipment and even from available purified reagents and metals. In this regard, the variety of cationic materials and metal complexes and compounds present in the less than trace amounts involved herein, and which must be rendered involatile or removed producing the ultra pure product salt, described herein is quite large. The problems presented by the presence of such materials have been the subject, for example, of "Proceedings for the 4th International Symposium on Halide Glasses", 1987.

The rigorous purity required for such glasses have, previously often been beyond the capability of the available technology, being, e.g., at about the level of just a few parts of impurity per billion (ppb) or less of the desired salt. Commercially available fluorides, even those sold as very high purity, have such impurities at the 10 to 1000 parts per million (ppm) level. Thus, there s a recognized need for a greater improvement in purity than presently available, such as, e.g., a one thousand to one million-fold betterment.

The presently known purification techniques for the production of zirconium and hafnium fluorides are recrystallization, solvent extraction, and the anhydrous methods of electromotive series displacement (ESD)-augmented distillation of $ZrF_4$ (the subject of U.S. Pat. No. 4,578,252), and chemical vapor purification (CVP) of zirconium metal (the subject of U.S. Pat. No. 4,652,438).

The recrystallization and solvent extraction methods accomplish purification at the $ZrOCl_2$ stage, but there is substantial impurity pickup, e.g., 2 to 10-fold, in the succeeding steps to $ZrF_4$. Furthermore, these methods tend, undesirably, to leave oxide and hydroxide impurities in the $ZrF_4$.

The anhydrous methods, wherein purification capability is based essentially on the high reducing power of solid reducing agents or electrodes which reduce, e.g., metal chlorides, and effect a lowering of impurity volatilities, are restricted in practical application by the limitations of mass transport in the proposed schemes. For example, in the CVP method, the calculated iron level in the product $ZrF_4$ is about 0.007 ppb, i.e., the equilibrium vapor pressure of $FeCl_2$ in contact with Zr metal at 923° K. In fact, however, the achieved level was about 200 ppb, a discrepancy of over $10^4$ as shown in Table 2 below.

In the known distillation purification of $ZrF_4$ from $BaF_2$-$ZrF_4$ solutions, there is a similar shortfall of purification. The distillation without ESD yields a product with unacceptable iron impurity levels, while the ESD-augmented option which gives further improvement, also falls far short of theoretical thermodynamic limits. Also, repeated distillation does not appear to yield further improvement. These data indicate a failure, due to limitations of mass transport, to achieve or approach the desired purity level of about 10 to about 100 ppb.

Objectives, therefore, of the present invention are to provide a method for the preparation of selected metal fluoride product salts and their precursor salts, of heretofore unattainable purity, wherein the method has highly acceptable requirements of energy input, chemical ingredient expense, and apparatus complexity. Further, it is an objective to provide an economical and relatively non-complex process, which, in operation, is relatively easy to control, i.e., temperature, volatilization rate, precursor salt take off, and subsequent product salt formation, is readily adaptable to batch, semi-continuous or continuous operation, and which can efficiently and effectively produce relatively large quantities of precursor salt and its fluoride product salt, e.g., several times the quantities per batch, heretofore possible by means of the aforementioned known processes.

These and other objects hereinafter appearing have been attained in accordance with the present invention which is defined in its broad sense as a process for purifying a chloro, bromo or iodo precursor salt of zirconium, hafnium or aluminum containing impurities, comprising providing a molten thermal body of one or more alkali or alkaline earth metal halides and said precursor salt, maintaining said body at a vaporizing temperature between about 150° C. and about 460° C. to vaporize said precursor salt away from its impurities while effecting a reducing condition in said body with a reducing agent which is fluid at said vaporizing temperature, is mobile in said body, and is non-reducing of said precursor salt metal, and isolating the volatilized pure precursor salt from said thermal body.

DETAILED DESCRIPTION OF THE INVENTION

Figure 1:
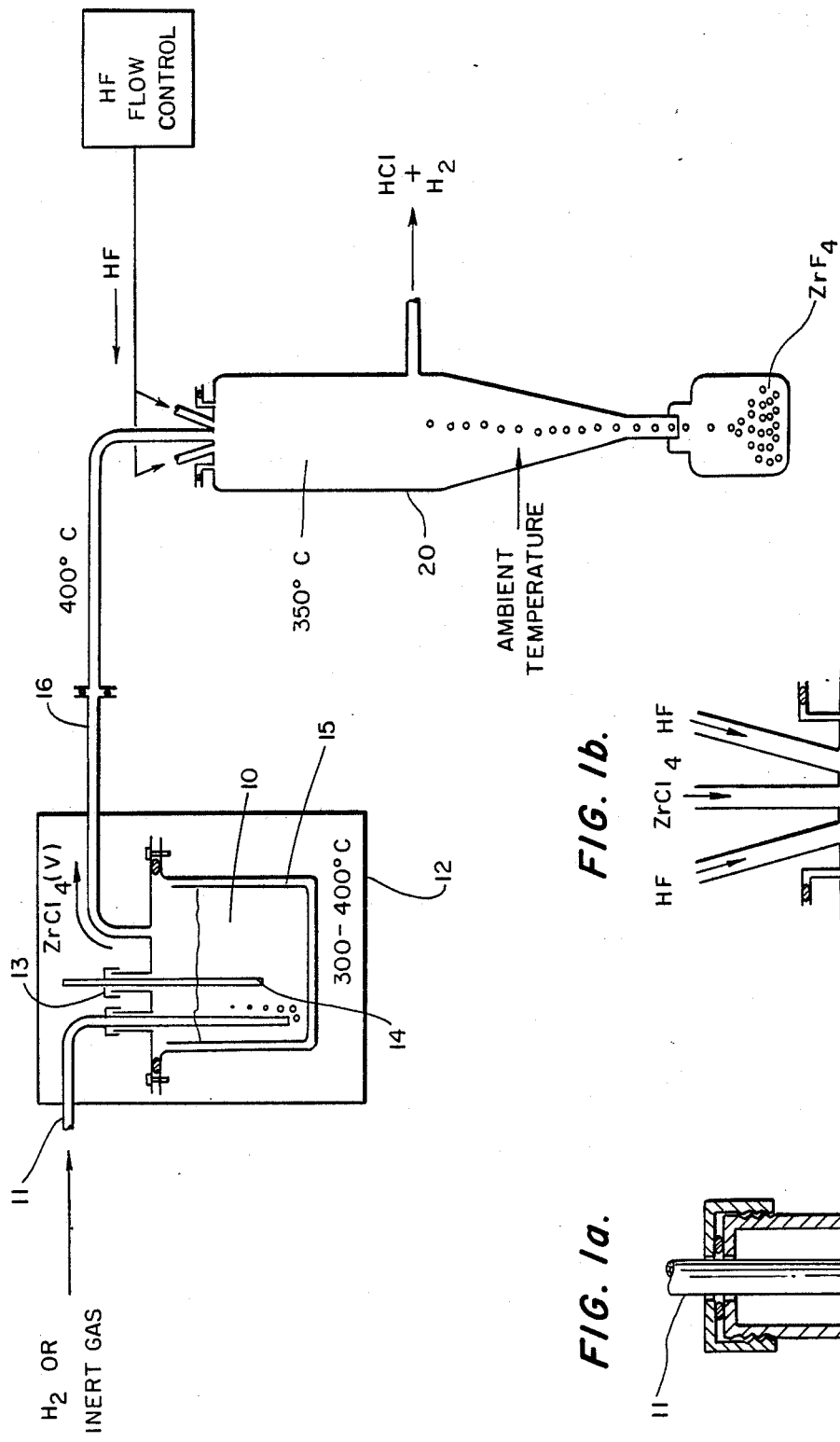
FIG. 1 is a schematic diagram of a typical apparatus useful in the practice of the present invention.
Figure 1B:
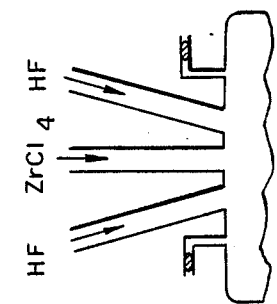
FIG. 1b is an enlarged partial view of the reactor nozzle shown in FIG. 1.
Figure 1A:
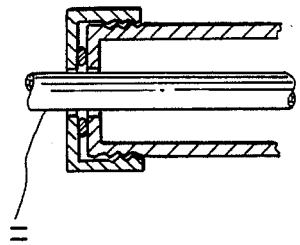
FIG. 1a is a typical sealing structure.

Referring to the overall system and apparatus used in the present invention, the fused salt bath 10 is contained in a sealed glass or quartz lined vessel 15 inside of a furnace 12. A line 11 for conveying hydrogen or an inert gas communicates with the interior of the vessel 15 connecting it to a source of gas (not shown). The line 11 extends below the level of the molten salt or eutectic mixture. A second structure 13 housing a thermo-couple 14 also communicates with the interior of the vessel 15 and below the surface of the melt 10 to sense the temperature of the melt and convey and display that sensed temperature (not shown) to an operator. A typical sealing structure is shown enlarged. A line 16 conveys $ZrCl_4$ vapor from the space in the vessel 15 above the melt 10 to a second vessel 20 where the chloride vapor is contacted with HF under conditions which produce $ZrF_4$ and HCl. Other details, such as temperatures, and the like, are included of specific labeled importance to the operation of the overall systems.

In the process of the present invention, the precursor halide is volatilized while cation containing impurities, such as $FeCl_2$, are rendered non-volatile by maintaining reducing conditions in the molten body or bath which keep such impurity halides and the like in a reduced, less volatile state. As will be further explained below, in contrast to prior methods, the contact surfaces of the thermal body components, the precursor salts and the reducing agent are highly mobile and hence there is less accumulation of impurities. The term "mobile" as used herein means that the material is capable of a high degree of dispersability. Thus, the severe mass transfer problems inherent in the aforementioned anhydrous methods of the prior art are substantially completely avoided by the present process. Furthermore, the boiling-out of the ultra pure precursor salt involves liquid-solid heat transfer surfaces so that its rate of production is more easily controlled than the prior processes. The amount of reducing agent employed should be selected to stoichiometrically reduce all of the impurity cations, however, less than this amount or a substantial excess may be employed, depending on the requirements of the system and the efficiency desired.

The model for calculating the impurity levels in product vaporized from the salt bath will be set out. It assumes vapor phase ideality (ideal gas law, pressure = fugacity) and solution ideality (Raoult's law), or,

| | |
|---|---|
| $P_i = X_i P^0{}_i$ | where $P_i$ = partial pressure of component i above the solution |
| | $X_i$ = mole fraction of i in solution |
| | $P^0{}_i$ = vapor pressure of pure i at the temperature of interest |

The impurities are assumed not to interact with each other and to be present in such small amounts that when discussing an impurity i, $X_{i \neq j} = 0$.

If one regards the vapor as being removed and condensed, $P_i / P_{ZrCl_4}$ (= one atm) is the concentration of i in the product $ZrCl_4$. As the distillation proceeds and product is taken out, the level of impurity in the bath rises, so the level in the product rises also. Eventually, the product would become unacceptable. This phenomenon is calculable by the Rayleigh equation for a one-step (no reflux) batch distillation as described by N. G. McDuffie, AIChE Modular Instruction Series, "Batch Distillation", Module B1.5, AIChE, 1980.

$$ln(S/F) = (1/(\alpha-1))ln(Xs(1-Xf))/Xf(1-Xs) + ln(1-Xf)/(1-Xs)$$

where
S = number of moles remaining in the salt bath
F = number of moles in original feed
$\alpha$ = ratio of vapor pressures, = $P_{ZrCl_4}$ (= 1 atm)/$P_i$
Xs = mole fraction $ZrCl_4$ in salt bath
Zf = mole fraction $ZrCl_4$ in feed Together with the conservation condition that the number of moles of distillate, D = F−S, this equation allows the calculation of impurity levels in the salt bath and in the average $ZrF_4$ product (blended overhead) at any point in the distillation. This is equivalent to knowing when to truncate the distillation to avoid intolerable impurity levels in the product. Below, the impurities will be calculated, on the further assumption of conversion to $ZrF_4$ with no pickup, for distillation extents of 0, 1, 10, 50 and 99 percent.

Detailed study of the vapors over condensed phases of the impurity-containing chlorides usually shows that there is some degree of polymerization. For example, $FeCl_2$, $NiCl_2$, and $CoCl_2$ are known to have at least some dimers and CuCl vaporizes as a trimer. At a given vapor pressure, there is transport at 2,3 ... times that of a monomer, but the $X_i$ in the Raoult's law equation is halved, ... etc. Therefore, the state of aggregation of the vapor phase molecules is immaterial if the same polymers exist in the melt. However, other degrees of solution and vapor phase complexity are conceivable and these manifest themselves as deviations from Raoult's law. But only a very strong effect, such as a 100-fold positive deviation, would affect the validity of the data herein.

The calculated results of the amounts of impurities in the product are shown in Table 1. The calculations required double precision and were done using the ASYST (TM) Statistical Software package. Vapor pressure data were evaluated at 400° C. (highest operating temperature of the salt bath). These data were taken from Reference (a) hereinafter, for transition elements (TE's) and from Reference (b) hereinafter for rare earth elements (RE's). Where ambiguities in vapor pressure equations existed, the higher values were used. The vapor pressure of $ZrCl_4$ over the bath is always one atmosphere. The impurity levels reported herein were obtained from Northern Analytical, Inc. on a sample of sublimed $ZrCl_4$, and have been converted to mole fraction, and then used at the "less than" values where appropriate.

(a) R. Colton, J. H. Canterford, "Halides of the First Row Transition Metals", 1969, Wiley-Interscience, London.

(b) D. Brown, "Halides of the Lanthanides and Actinides", 1968, Wiley-Interscience, London.

TABLE 1

Levels of impurities in $ZrF_4$ produced by distillation of purified $ZrCl_4$ from the salt bath.

| Impurity | Present in bath as | P° at 400° C., mm | $\alpha = 760/P°$ | Concentration of species in sublimed chloride according to NA, Inc., analysis | | Blended overhead concentration in $ZrF_4$, ppb, at the following percents of takeover % | | | | |
|---|---|---|---|---|---|---|---|---|---|---|
| | | | | in ppm | in mole fraction | 0 | 1 | 10 | 50 | 99 |
| Fe | $FeCl_2$ | $2.54 \times 10^{-4}$ | $3 \times 10^6$ | 2 | $2.8 \times 10^{-6}$ | .00090 | .00094 | .00097 | .00130 | .00450 |
| Cu | $CuCl_1$ | $1.31 \times 10^{-1}$ | $6 \times 10^3$ | .1 | $.14 \times 10^{-6}$ | .024 | .024 | .025 | .038 | .11 |
| Ni | $NiCl_2$ | $9.22 \times 10^{-6}$ | $8 \times 10^7$ | .05 | $.07 \times 10^{-6}$ | $1 \times 10^{-6}$ | $1 \times 10^{-6}$ | $1 \times 10^{-6}$ | $2 \times 10^{-6}$ | $7 \times 10^{-6}$ |
| Co | $CoCl_2$ | $1.05 \times 10^{-5}$ | $7 \times 10^7$ | .08 | $.11 \times 10^{-6}$ | $2 \times 10^{-6}$ | $2 \times 10^{-6}$ | $2 \times 10^{-6}$ | $4 \times 10^{-6}$ | $1.4 \times 10^{-5}$ |
| Ce | $CaCl_3$ | $2.5 \times 10^{-7}$ | $3 \times 10^9$ | .003 | $.004 \times 10^{-6}$ | All are $< 10^{-7}$ ppb | | | | |
| Pr | $PrCl_3$ | $6 \times 10^{-8}$ | $1 \times 10^{10}$ | .003 | $.004 \times 10^{-6}$ | | | | | |
| Nd | $NdCl_3$ | $6 \times 10^{-8}$ | $1 \times 10^{10}$ | .003 | $.004 \times 15^{-6}$ | | | | | |

It is seen that the levels of impurity in the delivered product are very low, even at high take-over; this means that owing to low initial levels and low volatilities, even the enrichment of impurities in the salt bath is insignificant. This purity exceeds by a factor of 30 the requirements for 0.001 dB/km loss described by R. C. Folweiler, F. X. Pink, *Proceedings of the 4th International symposium on Halide Glasses*, Monterey, Calif., 1987.

The presently employed molten thermal bodies in general are prepared, for example, simply by melting one or more of the anhydrous halides of alkali or alkaline earth metals. Especially preferred halides are the chlorides of sodium and potassium since they are inexpensive, readily available, and readily meet the requirements of the thermal body, including preferably that the one atmosphere isobar of vapor pressure of the desired precursor salt be attainable at a conveniently low temperature. This is preferable since the purified precursor salt vapors are easily boiled out against ambient opposing pressure and taken downstream to be united with a fluorinating agent to form the fluoride product salt. Another requirement met by these halides is that they are essentially non-volatile at the process temperatures, and are not transported with the purified precursor salt. An initial purging or contacting of this melt with hydrogen gas expedites the reduction of many impurity materials.

The reducing agent contacts the molten thermal body, including the impurity-containing salt, via a fluid-fluid interface of enormous surface area. This interface may be a gas-liquid interface which would be the case when a gaseous reducing agent such as hydrogen is bubbled through the bath, or a liquid-liquid interface which would be the case when a low-melting, electropositive metal such as lead or zinc is suffused, distributed or diffused throughout the bath. The use of a fluid-fluid interface provides for continuous renewal of the reducing agent substrate and thus achieves the avoidance of impurity accumulation thereon. In contrast, gas-solid interfaces such as in the CVP method, or liquid-solid interfaces such as in the ESD method, are limited by impurity accumulation most notably at the reduction site. It is also important that the reducing agent be unable to reduce the precursor salt metal to lower valence states or to the metal which would retard or prevent its vaporization in the present process. Such a condition can occur, for example, with molten aluminum kept in the $BaF_2$-$ZrF_4$ mixture of U.S. Pat. No. 4,578,252.

The precursor salts of this invention are all subliming solids and normally form liquids only at elevated pressures. However, the present thermal body or bath serves as a "chemical regulator" which controls the purified salt vapor pressure within a convenient range and affords the advantages of liquid-solid heat transfer systems. In this regard, the flow of fluorinating agent for converting the purified salt to ultra high purity fluoride can easily be adjusted to match the volatilized salt output and thus insure optimum use of the fluorinating agent.

A further advantage to delivery of the purified precursor salt from the thermal body or bath is that the thermal body halides wet any particulate materials imported into or generated within the bath. Therefore, oxides, coke, or the like which may be present in the precursor salt, will, preferentially, be retained in the bath. Owing to the high stability of the oxides of Zr, Hf and Al, they will form from any oxygen or moisture which may come into the system and report to the bottom of the bath as an oxidic sludge, thus eliminating these impurities from the system.

Use has been made of molten salts to purify halide vapors, for example, see Trans. Metall. Soc. AIME, 224,965 (1962), but that operation was a scrubbing where the vapor was bubbled through the salt bath. The present invention does not involve the transport and purification treatment of an impure vapor but rather generates the purified vapor directly from the thermal body or bath. Therefore, the purification and production steps are decoupled so that ample time can be taken for purification reactions to occur since they do not depend on flow rate, bubble size, sparging efficiency, or the like.

The following Table 2 gives comparative purification data for the aforementioned prior art processes and the process of this invention, based upon themodynamic calculations further explained below.

TABLE 2

Impurities in ppb of $ZrF_4$ (a)

| Impurity | Req'd for .01 db/km (b) | NRL Recrystallization (c) | ESD Distillation of $ZrF_4$ from $BaF_2$ (d) | CVP (e) | Present Process, from typical starting $ZrCl_4$ |
|---|---|---|---|---|---|
| Fe | 0.3 | 500 | 500 | 200 | 0.001 |
| Co | 0.3 | $<=300$ | | ND, $<10$ | $4 \times 10^{-6}$ |
| Ni | 3.0 | $<=70$ | | $<=20$ | $2 \times 10^{-6}$ |
| Cu | 10100 | $<=40$ | | ND, $<10$ | 0.04 |
| Ce | | $<200$ | | | $<10^{-7}$ |
| Pr | | $<200$ | | | $<10^{-7}$ |

TABLE 2-continued

| Impurity | Req'd for .01 db/km (b) | NRL Recrystal- lization (c) | ESD Distil- lation of ZrF4 from BaF2 (d) | CVP (e) | Present Process, from typical starting ZrCl4 |
|---|---|---|---|---|---|
| Nd | 0.5 | <800 | | | <10$^{-7}$ |

(a) converted to this basis where appropriate for uniformity
(b) G. Lu, I. Aggarwal, Proceedings for the 4th International. Symposium on Halide Glasses, Monterey, CA, 1987.
(c) C. F. Fisher, NRL High Purity Fluorides Pre-proposal conference, Washington, D.C., Dec. 12, 1986.
(d) M. Robinson, Materials Science Forum, 5, 19-34 (1985)
(e) R. C. Folweiler, D.E. Guenther, Materials Science Forum, 5, 43-48 (1985).

With reference to this data and the aforementioned mass transfer problems of the prior anhydrous processes, on a relative physical basis with respect to the present process the solid pieces of metallic reducing agents of the prior art are enormous in size but provide relatively minute, limited surface area for electron transfer in the redox reaction. With these solid agents there is either limited or no mobility, and hence no reducing substrate renewal as exists with the present fluid, mobile reducing agents which provide constantly renewed reducing substrate on an atomic scale of essentially infinite surface area.

With specific reference to the prior art processes, the CVP method is transport-limited in that the zirconium metal surface which is chlorinated to give $ZrCl_4$ becomes enriched in iron. Iron is thus chlorinated at a faster rate that it can diffuse inward. Therefor, owing to a mismatch of rates, chlorination vs. diffusion, the impurity-retaining mechanism which is the reducing condition established by presence of zirconium metal does not come fully into play and the iron level in the product is much higher than expected.

The $BaF_2$-$ZrF_4$ distillation is a more favorable situation, and indeed, the iron level in the product comes much more nearly in line with calculations based on the relative vapor pressure of $FeF_3$ and $ZrF_4$. For the ESD-augmented option, again, rising contamination of the surface of the reducing agent causes iron transport into the liquid and thence into the product vapor. This also illustrates a disadvantage of fluoride purification in that the vapor pressure of the fluoride is closer to that of the impurities than the chlorides. Also, for $ZrF_4$ vaporization where the system contains substantial oxide impurities, a thermally insulating surface layer forms and thickens on the thermal body surface, tending to lower the vaporization rate of the $ZrF_4$.

The above observations on the prior art processes may be restated to highlight that these methods suffer from the fact that the time frames allowed for purification are determined by a desired time frame for production of material. There is no theoretical reason for the rates of these processes to be commensurate, and indeed they are far from being so. For the case of CVP, the experimental apparatus was sized, in effect, to produce chlorinated material at a convenient rate, controlled by the rate of chlorine addition. This chlorination rate, however, is entirely unsuited to the purification rate, which is the diffusion rate of iron into zirconium metal.

A specific and preferred embodiment of the present invention is the purification of anhydrous zirconium tetrachloride, wherein the thermal body or bath comprises a mixture of NaCl and KCl in about an 8:29 mole ratio, and the reducing agent is lead metal. In this embodiment, the $ZrCl_4$ melts together with the NaCl-KCl mixture to form a mobile liquid near 230° C. A phase diagram as described by J. D. Kim and D. R. Spink, in J. Chem. Eng. Data, 19, 36 (1974) shows that if heated at one atmosphere, a mixture of 68 mole percent $ZrCl_4$ and 32 mole percent of a mixture of NaCl and KCl in a molar ratio of about 8/29 will evolve $ZrCl_4$ vapor near 330° C. Upon continued heating, the composition of the bath will change along the one atmosphere isobar until the $ZrCl_4$ is depleted to the point at which $(Na,K)_2ZrCl_6$ solid appears, near 400° C. Thereafter, the bath is no longer homogenous and sharply higher temperatures must be imposed to maintain one atmosphere pressure It is preferable at this point to cool the bath and recharge it. In this embodiment, molten lead metal is included in the bath vessel in a concentration of about 0.1 mole of lead per mole of $ZrC_4$. The lead will not react with any of the bath materials or precursor salts, but will react with the impurities, e.g., to reduce impurity cations. By cycling between the previously recited two temperatures, 10 kg of initial bath of the above composition yields about 3.3 kg of purified $ZrCl_4$ before needing recharge.

Several impurity-sequestering mechanisms operate simultaneously in the thermal bath. First, its operating temperature is low and the volatilities of the impurity chlorides are consequently low. Secondly, the fluid reducing agents, such as hydrogen or lead, chemically reduce, for example, Ni, Co and Cu cations to non-volatile metals. In the case of copper, it will not only be reduced, but also will be extracted into and sequestered in the lead substrate. These reductions do not obstruct the purifying Pb° substrate since it is mobile and essentially continually renewed. Thirdly, the bath affords an opportunity for the formation of stable binary compounds from the bath components and the impurity chlorides. Examples of such known compounds are $Na_2FeCl_4$, $KFeCl_3$, $K_2CoCl_4$ and $K_3NdCl_6$, the vapor pressures of which are lower than the uncomplexed bath components. The net effect of all of these factors is the tendency to generate a more pure $ZrCl_4$.

As $ZrCl_4$ is evolved from the bath, impurities build up and appear in the product at an increasing rate. However, the vapor pressure differences between $ZrCl_4$ and the impurities are so great that it is possible to take off about 80% of the available $ZrCl_4$ before the impurity level in the product doubles.

The expected impurity levels in the product per initial ppm of impurity in the thermal body are calculated as a function of takeover from the bath by using the equations for a one step Rayleigh distillation and taking alpha, the relative volatility of $ZrCl_4$ and the impurity chloride as the ratio of the impurity chloride vapor pressure and one atmosphere. Vapor pressure data at 400° C. for $FeCl_2$, $CoCl_2$, $NiCl_2$ and $CuCl$ are taken from Colton and Canterford, "Halides of the First Row Transition Metals", 1969, Wiley-Interscience, London. This calculation assumes that the reducing condition in the bath, other than keeping iron and copper as $FeCl_2$ an $CuCl$ respectively, has no effect on the purity. It is therefore a conservative estimate of purity.

| Impurity | Vapor pressure at 400° C., torr | ppb impurity in product for each one ppm impurity initially in the thermal body or bath, for several percentages of takeover. | | |
|---|---|---|---|---|
| | | 0 | 10 | 50 |
| $FeCl_2$ | $2.5 \times 10^{-4}$ | .0004 | .0005 | .0006 |
| CuCl | $1.3 \times 10^{-1}$ | .24 | .25 | .4 |
| $NiCl_2$ | $9.2 \times 10^{-6}$ | $2 \times 10^{-5}$ | $2 \times 10^{-5}$ | $4 \times 10^{-5}$ |
| $CoCl_2$ | $1.1 \times 10^{-5}$ | $2 \times 10^{-5}$ | $4 \times 10^{-5}$ | $8 \times 10^{-5}$ |
| $CeCl_3$ | $2.5 \times 10^{-7}$ | all are less than $10^{-5}$ ppb | | |
| $PrCl_3$ | $6 \times 10^{-8}$ | | | |
| $NdCl_3$ | $6 \times 10^{-8}$ | | | |

It is seen that only copper approaches the ppb level. This is without any stronger reducing agent than hydrogen, which suffices to keep iron as $FeCl_2$ and copper as CuCl.

The above example illustrates that the feedstock precursor salt could have several thousand ppm of impurities and still be purified to the sub-ppb level by the techniques of this invention. Hence feedstocks unsuitable for use by other techniques are directly usable by this invention.

The foregoing detailed description is also applicable to $HfCl_4$ and would involve only small changes of parameters, for example, a few degrees shift of operating temperature. In the case of aluminum, similar physical-chemical properties obtain for $AlCl_3$-rich molten salt mixtures with alkali metals. Eutectic temperatures in such systems are about 100° C. lower than in the corresponding $ZrCl_4$ systems, so the impurity volatilities will be even more favorable. Extensions of the above concepts to bromide and iodide systems are achievable without undue experimentation.

The final step of the process is the halo interchange reaction of the purified precursor salt with a gaseous fluorinating agent. The chemical stability of the fluoride is so great that the reaction equilibria for all precursor halides with, for example, anhydrous HF is overwhelmingly in favor of fluoride formation, even with only slight excesses of fluorinating agent in the gas stream. In this step, the vapors of $ZrCl_4$ are conducted into a chamber kept at about 400° C. where they contact a flow of HF gas. This chamber could, for example, have the form of a condenser vessel, with provisions for collection of the solid product fluoride and an exit vent for the HCl by-product gas. Maintaining a zone within the chamber above 350° C., will cause any unreacted purified salt, which may be deleterious to high purity glass manufacture, to exit with the HCl and not be incorporated into the product.

A further and very significant advantage of this process is its overall low operating temperature. This allows the use of ordinary materials of construction which can be selected so as to diminish their contribution of impurities into the system. Examples of such materials are zirconium and magnesium metals, which form protective fluoride coatings at low temperatures but which are reactive at higher temperatures. Such materials are available in high purities themselves and minor corrosion to them offers no threat to the purity of the product. Higher temperature processes such as of the aforementioned prior art are forced to use materials such as platinum or glassy carbon.

I claim:

1. The process for purifying a chloro, bromo or iodo precursor salt of zirconium, hafnium or aluminum comprising providing a molten thermal body of one or more alkali or alkaline earth metal halides and said precursor salt containing impurities, maintaining said body at a vaporizing temperature between about 150° C. and about 460° C. to vaporize said precursor salt away from its impurities while effecting a reducing condition in said body with reducing agent which is fluid at said vaporizing temperature, mobile in said body, and non-reducing of said precursor salt, and isolating the purified volatilized precursor salt from said body.

2. The process of claim 1 wherein said body temperature is maintained between about 300° C. and about 450° C.

3. The process of claim 1 wherein said reducing condition is maintained by one or more of hydrogen, methane, ammonia, molten zinc or molten lead diffused throughout said body.

4. The process of claim 1 wherein the halides of said thermal body comprise a mixture of sodium and potassium chlorides in a mole ratio of NaCl/KCl of from about 1/10 to about 1/1.

5. The process of claim 4 wherein said ratio is from about 1/5 to about ⅓.

6. The process of claim 4 wherein said ratio is about 8/29.

7. The process of claim 1 wherein said body is maintained under about one atmosphere pressure.

8. The process of claim 1 wherein said precursor salt is $ZrCl_4$ and said reducing condition is maintained by molten lead in a molar ratio of $ZrCl_4/Pb$ of from about 20/1 to about 5/1.

9. The process of claim 1 wherein the initial molar ratio of precursor salt to thermal body halide is from about 9/1 to about 5/1.

10. The process of claim 9 wherein the precursor salt is $ZrCl_4$ or $HfCl_4$ and the thermal body temperature is maintained between about 330° C. and about 400° C. until at least about 80 mole percent of said precursor salt is isolated from said body.

11. The process of claim 1 carried out in a vessel of zirconium or magnesium metal.

12. The process of any one of claims 1-11 wherein the volatilized, isolated precursor salt is contacted with a fluorinating agent and converted to the fluoride.

13. The process of claim 12 wherein the fluorinating agent is one or more of HF, $NF_3$, $F_2$, $SF_4$, $SF_6$, $SF_5$ and noble gas fluorides.

14. The process of claim 1 wherein the precursor salt is the chloride of zirconium or hafnium, the thermal body halide is a mixture of sodium and potassium chlorides, and the reducing agent is lead.

15. A highly purified precursor salt prepared according to the process of claim 1.

16. A highly purified fluoride prepared according to the process of claim 12 or claim 13.

17. The process of claim 4 wherein said reducing agent is at least 1 of lead or zinc metal diffused in said thermal body, and at least 1 of hydrogen, methane or ammonia purged through said body.

18. The process of claim 1 wherein impure $ZrCl_4$ and reducing agent are continuously fed into the thermal body and admixed therewith, and the purified $ZrCl_4$ vapor is continuously removed overhead.

19. A purified Fluoride of Zr, Hf or Al prepared according to claim 13 wherein the cationic impurity level therein comprises per 1 billion parts of the fluoride:

Fe---<about $10^{-3}$
Co---<about $10^{-4}$

Ni---<about $10^{-4}$
Cu---<about $10^{-1}$
Ce---<about $10^{-6}$
Pr---<about $10^{-6}$
Nd---<about $10^{-6}$ 20. The process of claim 1 wherein the precursor salt initially fed to the thermal body is $ZrCl_4$ or $HfCl_4$ which has been purified by sublimation and has an iron cation level of < about 100 ppm of the precursor salt.

* * * * *